United States Patent [19]

Akai

[11] Patent Number: 5,378,894
[45] Date of Patent: Jan. 3, 1995

[54] X-RAY DETECTOR INCLUDING SCINTILLATOR CHANNEL SEPARATOR CAPABLE OF IMPROVING SENSITIVITY OF X-RAY DETECTOR

[75] Inventor: Yoshimi Akai, Tochigiken, Japan

[73] Assignee: Kabushiki Kaisha Toshiba, Tokyo, Japan

[21] Appl. No.: 985,298

[22] Filed: Dec. 4, 1992

[30] Foreign Application Priority Data

Dec. 11, 1991 [JP] Japan .................. 3-327475

[51] Int. Cl.⁶ .............................................. G01T 1/20
[52] U.S. Cl. ...................................... 250/368; 250/367
[58] Field of Search ............................... 250/367, 368

[56] References Cited

U.S. PATENT DOCUMENTS

| | | | |
|---|---|---|---|
| 4,720,426 | 1/1988 | Englert et al. | 428/344 |
| 4,731,534 | 3/1988 | Klein et al. | 250/366 |
| 5,276,328 | 1/1994 | Yoshida et al. | 250/368 |

*Primary Examiner*—Constantine Hannaher
*Attorney, Agent, or Firm*—Oblon, Spivak, McClelland, Maier & Neustadt

[57] ABSTRACT

A novel scintillator channel separator is constructed of a metal thin film and at least two polymer sheets for sandwiching the metal thin film. The scintillator channel separator is used in a scintillator type X-ray detector employed in a third-generation, or fourth-generation X-ray CT system. This scintillator channel separator optically separates scintillation light emitted from scintillator elements from each other within a plurality of scintillator element channels of an X-ray scintillator array. The scintillator channel separator includes at least a first thin film capable of blocking transmission of the scintillation light occurring in the adjoining scintillator element channels; and first and second polymer sheets each having first and second major surfaces, and capable of reflecting the scintillation light. The first thin film is sandwiched between the first major surfaces of the first and second polymer sheets, and the second major surfaces of the first and second polymer sheets are stuck to corresponding side surfaces of the respective adjoining scintillator elements, so that the thin film and the first and second polymer sheets constitute the scintillator channel separator.

30 Claims, 8 Drawing Sheets

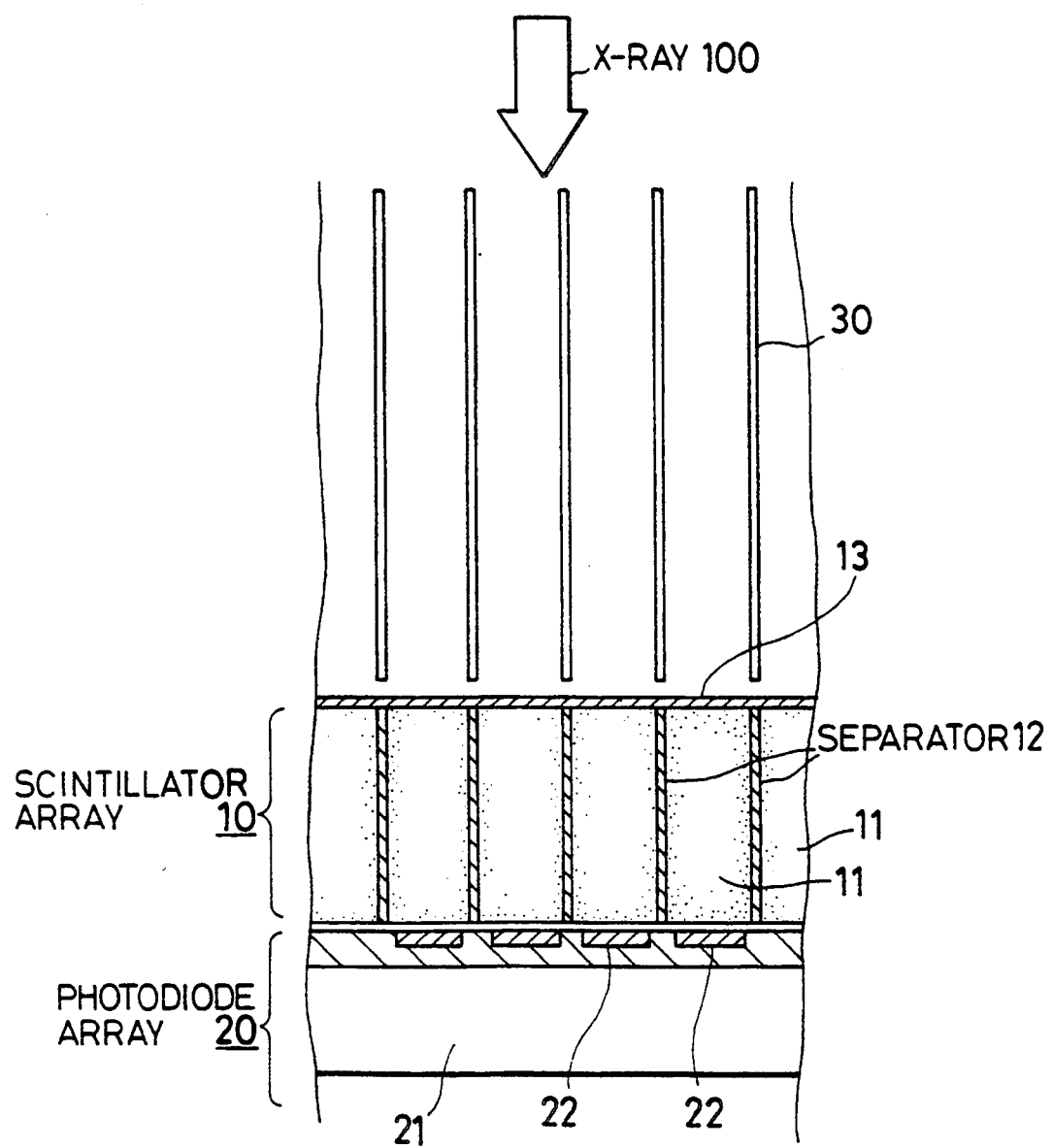

FIG. 4B

| | PRIOR ART | FIRST EMBODIMENT |
|---|---|---|
| CHANNEL SEPARATOR | WHITE PAINT 30μm<br>LEAD (Pb) 100μm<br>WHITE PAINT 30μm | LUMIRROR SHEET 75μm<br>ALUMINUM (Aℓ) 20μm<br>LUMIRROR SHEET 75μm |
| SCINTILLATOR | CdWO$_4$ | CdWO$_4$ |

FIG. 4C

| | PRIOR ART | FIRST EMBODIMENT |
|---|---|---|
| RATIO OF SENSITIVITIES | 1.0 | 1.1 − 1.2 |

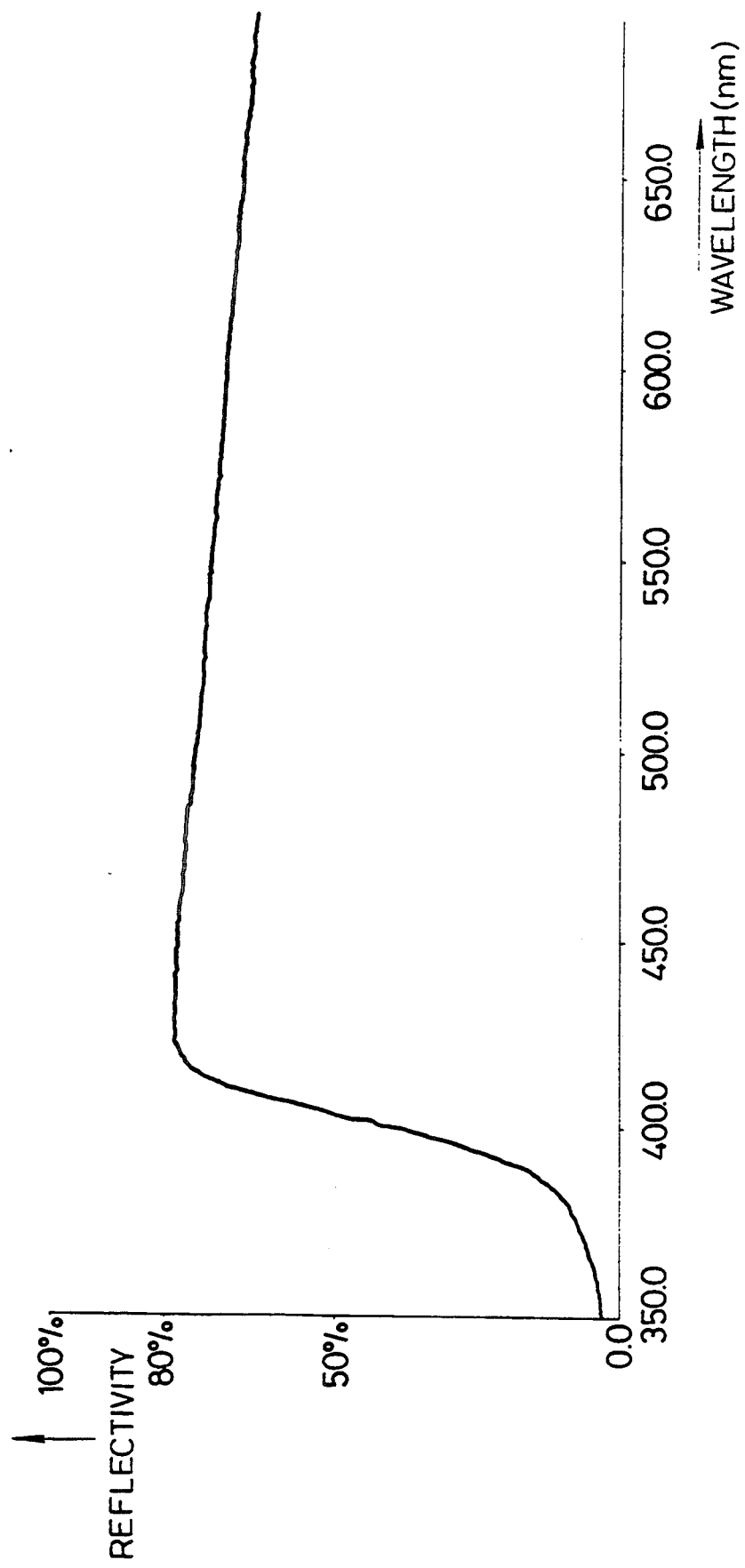

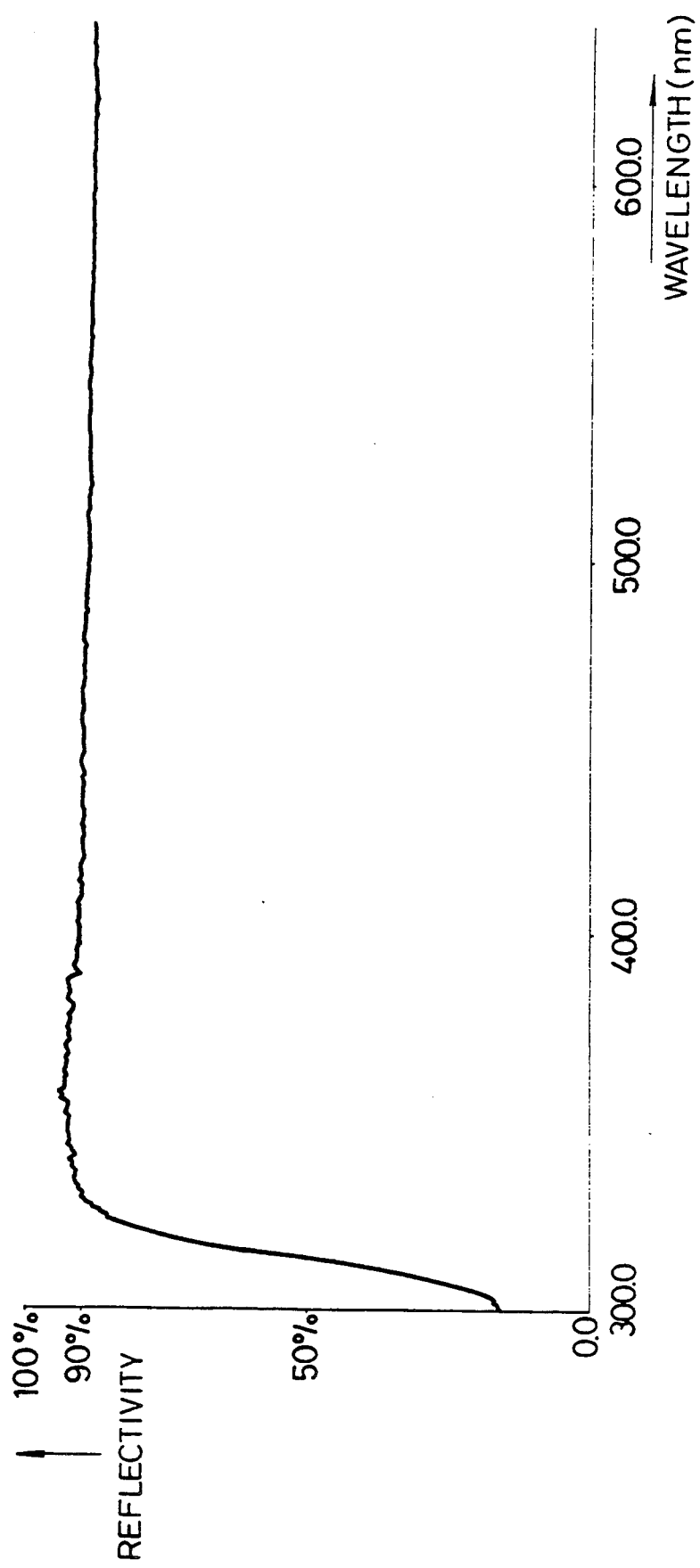

X-RAY DETECTOR INCLUDING SCINTILLATOR CHANNEL SEPARATOR CAPABLE OF IMPROVING SENSITIVITY OF X-RAY DETECTOR

BACKGROUND OF THE INVENTION

1. Field of the Invention

The present invention generally relates to an X-ray detecting apparatus constructed of a scintillator array and a photodiode array. More specifically, the present invention is directed to an X-ray detecting apparatus including a film-shaped scintillator-channel separator capable of increasing sensitivity of the X-ray detecting apparatus.

2. Description of the Prior Art

In X-ray CT (computerized tomographic) imaging apparatuses such as a third-generation X-ray CT scanner and a fourth-generation X-ray CT scanner, X-ray detectors with scintillator arrays have been employed. Only a major construction of the typical X-ray detector is represented in FIG. 1. As shown in FIG. 1, this X-ray detector is mainly arranged by a scintillator array 10 and a photodiode array 20. The scintillator array 10 is constructed of a plurality of scintillator elements 11 and also a plurality of channel separators 12. Each of these scintillator elements 11 is sandwiched by the separators 12 at their side surfaces, thereby to constitute a scintillator channel. Then, a plurality of scintillator channels are constructed in an integral form. A reflection layer 13 is fabricated on an upper surface of the scintillator array 10, upon which an X-ray 100 is incident through a collimator 30.

The above-explained photodiode array 20 is fabricated on a substrate 21 in such a manner that a large quantity of photodiodes 22 are arranged at the same pitch, or interval as the channel pitch of the scintillator array 10. The respective photodiodes 22 are junctioned to a lower surface of the scintillator array 10 in relation to the respective scintillator elements 11.

On the other hand, the channel separator 12 employed in the scintillator array 10 has typically one function. That is, this function is to effectively conduct visible light produced within the relevant scintillator element to the corresponding photodiode 22, namely, an improvement in sensitivity.

The above-described scintillator X-ray detector is described in, for instance, Japanese Laid-open (KOKAI DISCLOSURE) Patent Application No. 58-118977 (opened on Jul. 15, 1983); No. 58-123488 (opened on Jul. 28, 1983); No. 58-216974 (opened on Dec. 16, 1983); No. 58-219471 (opened on Dec. 20, 1983); and No. 59-88676 (opened on May 22, 1984).

In general, a channel separator of a scintillator array employed in a conventional X-ray detector has been manufactured as follows:

1). White paint is coated as a light reflection layer on both surfaces of a heavy metal thin film made of, e.g., lead (Pb), tantalum (Ta), molybdenum (Mo), resulting in a first conventional channel separator. This prior art separator is sandwiched between side surfaces of the neighbour scintillator elements.

2). A binder is mixed with titanium dioxide ($TiO_2$), barium sulfate ($BaSO_4$) or magnesium oxide ($MgO_2$) to form a slurrying material. Then, this slurrying material is filled with a space between the neighbour scintillators elements and dried, resulting in a second conventional channel separator layer.

As to the first conventional channel separator, although the crosstalk preventing effect achieved by employing such a heavy metal thin film could be sufficiently high, the reflection layer coated with the white paint owns low reflectivity. As a consequence, there is a problem that sufficient X-ray detecting sensitivity could not be achieved. Furthermore, there is another drawback that the reflectivity characteristics of the white painted reflection layer are partially fluctuated due to uneven white painting.

On the other hand, in the second conventional channel separator layer, since transmittance of this channel separator with respect to visible light is on tile order of 1 to 5%, satisfactory crosstalk preventing effect could not be achieved. If a thickness of the second channel separator layer would be made sufficiently thicker, then the light crosstalk components could be satisfactorily suppressed. However, such a solution could not the accepted due to a practical reason. That is, the thickness of the second separator layers cannot be made very thick under the limited channel pitches, Moreover, since specific, high manufacturing techniques are required to manufacture such a second separator layer, higher manufacturing cost than that of the first conventional separator is necessarily required.

SUMMARY OF THE INVENTION

The present invention has been made in an attempt to solve the above-described various problems, and therefore, has an object to provide a novel scintillator channel separator capable of increasing sensitivities of X-ray detection at acceptable high levels.

Another object of the present invention is to provide a scintillator channel separator capable of being manufactured in a simple method.

A further object of the present invention is to provide a scintillation channel separator capable of having uniform reflectivity.

To achieve the above-described objects and other features, an X-ray detecting apparatus, according to the present invention, comprises:

a first thin film (2) capable of blocking transmission of the scintillation light occurring in the adjoining scintillator element channels; and first and second polymer sheets (1:101) each having first and second major surfaces, and capable of reflecting the scintillation light, said first thin film (2) being sandwiched between said first major surfaces of said first and second polymer sheets (1:101), and said second major surfaces of said first and second polymer sheets (1:101) being stucked to corresponding side surfaces of the respective adjoining scintillator elements (11), whereby said thin film (2) and said first and second polymer sheets (1:101) constitute the scintillator channel separator (120).

An X-ray detecting apparatus, according to another aspect of the present invention, comprises at least:

a scintillator array constructed of a plurality of scintillator elements (11) for emitting scintillation light upon receipt of an X-ray;

a photodiode array (20) constructed of a plurality of photodiodes (22) capable of detecting scintillation light emitted from said scintillator elements (11); and a scintillator channel separator (120) for optically separating scintillation light from each other within each of plural scintillator element channels of said X-ray scintillator array, said scintillator channel separator (120) including:

a first thin film (2) capable of blocking transmission of the scintillation light occurring in the adjoining scintillator element channels; and first and second polymer sheets (1:101) each having first and second major surfaces, and capable of reflecting the scintillation light, said first thin film (2) being sandwiched between said first major surfaces of said first and second polymer sheets (1:101), and said second major surfaces of said first and second polymer sheets (1:101) being stuck to corresponding side surfaces of the respective adjoining scintillator elements (11), whereby said thin film (2) and said first and second polymer sheets (1:101) constitute the scintillator channel separator (120).

BRIEF DESCRIPTION OF THE DRAWINGS

For a better understanding of the present invention, reference is made of the detailed description in conjunction with the accompanying drawings, in which:

FIG. 1 schematically illustrates a major construction of the conventional X-ray detecting apparatus;

FIGS. 4B and 4C show measurement data about these sensitivities;

FIG. 5A is a graphic representation about reflectivity of the conventional scintillator channel separator 12 and FIG. 5B is a graphic representation concerning reflectivity of the first scintillator channel separator 120.

DETAILED DESCRIPTION OF THE PREFERRED EMBODIMENTS

CONSTRUCTION OF FIRST SCINTILLATOR CHANNEL SEPARATOR

Figure 2A:
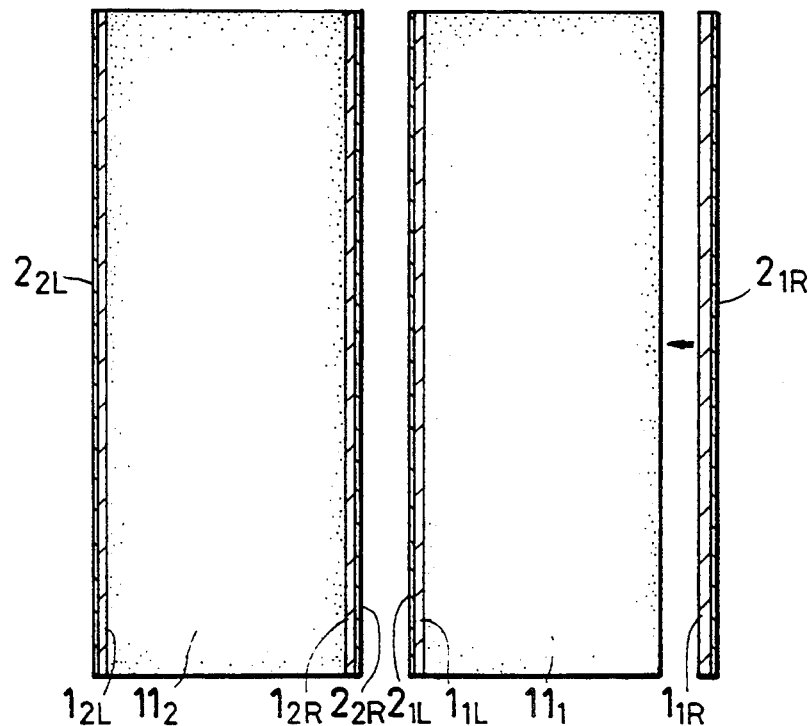
FIG. 2A and 2B schematically represent a channel separator and relevant scintillator elements, employed in an X-ray detecting apparatus according to a first preferred embodiment of the present invention.
Figure 2B:
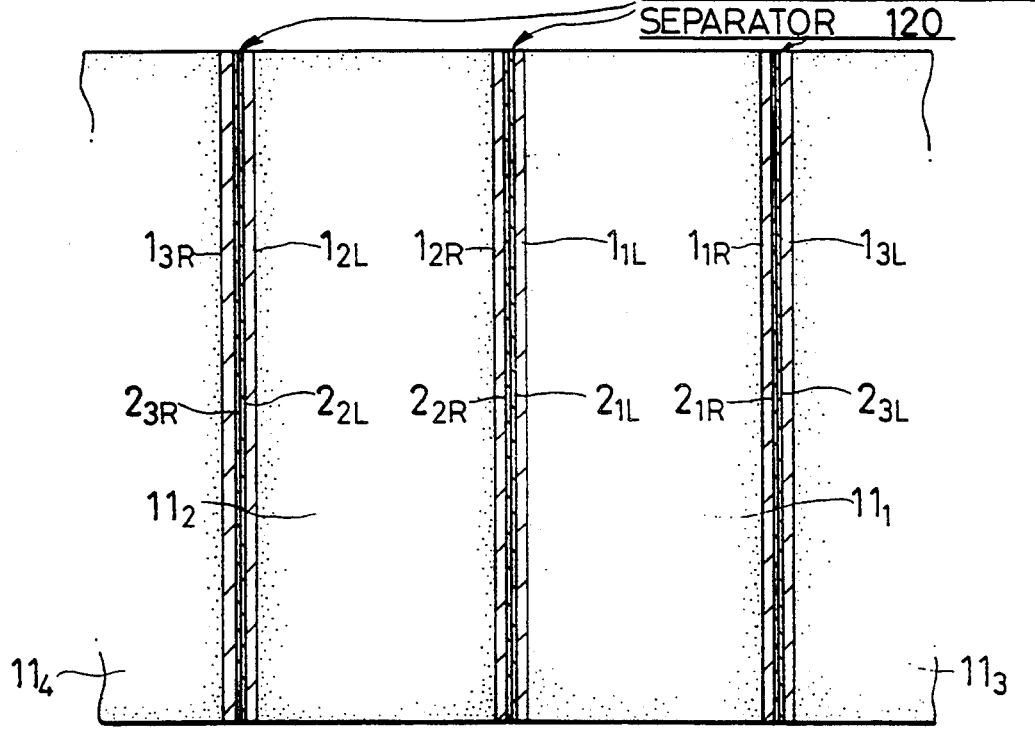

Referring now to FIGS. 2A and 2B; a construction of a scintillator channel separator 120 employed in a scintillator type X-ray detecting apparatus according to a first preferred embodiment of the present invention will be described.

It should be noted that the same reference numerals shown in FIG. 1 will be employed as those for denoting the same constructive elements represented in the following figures.

In the first scintillator channel separator 120 shown in FIG. 2A, for the sake of simplicity, only two sets of channel separators, or scintillator elements $11_1$ and $11_2$ are explained as follows. First, as to a right-hand scintillator element $11_1$ of FIG. 2A, two sheets of color polymer (macromolecule) sheets $1_{1R}$ and $1_{1L}$ are prepared. A metal thin film 2 is formed on one surface of the respective color polymer sheets $1_{1R}$ and $1_{1L}$ in such a manner that a right-hand metal thin film $2_{1R}$ is formed on one surface of the right-hand polymer sheet $1_{1R}$, whereas a left-hand metal thin sheet $2_{1L}$ is formed on one surface of the left-hand polymer sheet $1_{1L}$. Thereafter, each of the other surfaces of these color high polymer sheets $1_{1R}$, $1_{1L}$ is fixed to the corresponding side surface of the right-hand scintillator element $11_1$ (will be discussed more in detail).

Similarly, two sets of metal thin films $2_{2R}$, $2_{2L}$ are first formed on the respective surfaces of color high polymer sheets $1_{2R}$, $1_{2L}$. Subsequently, the remaining empty surfaces of these color polymer sheets $1_{2R}$, $1_{2C}$ with the metal thin films $2_{2R}$, $2_{2C}$ are fixed to the relevant side surfaces of a second scintillator element $11_2$.

Then, as represented in FIG. 2B, empty surfaces of these metal thin films $2_1$, $2_2$ are fixed to each other in such a manner that, for instance, an empty surface of the right-hand second metal thin film $2_{2R}$ (namely, this empty surface is not connected, or stuck to the color high polymer sheet $1_{2R}$) is close-connected to an empty surface of the left-hand first metal thin film $2_{1L}$. As a result, three sets of the scintillator channel separator 120 are fabricated as illustrated in FIG. 2B.

DETAILED CONSTRUCTION OF FIRST SCINTILLATOR CHANNEL SEPARATOR

Figure 3:
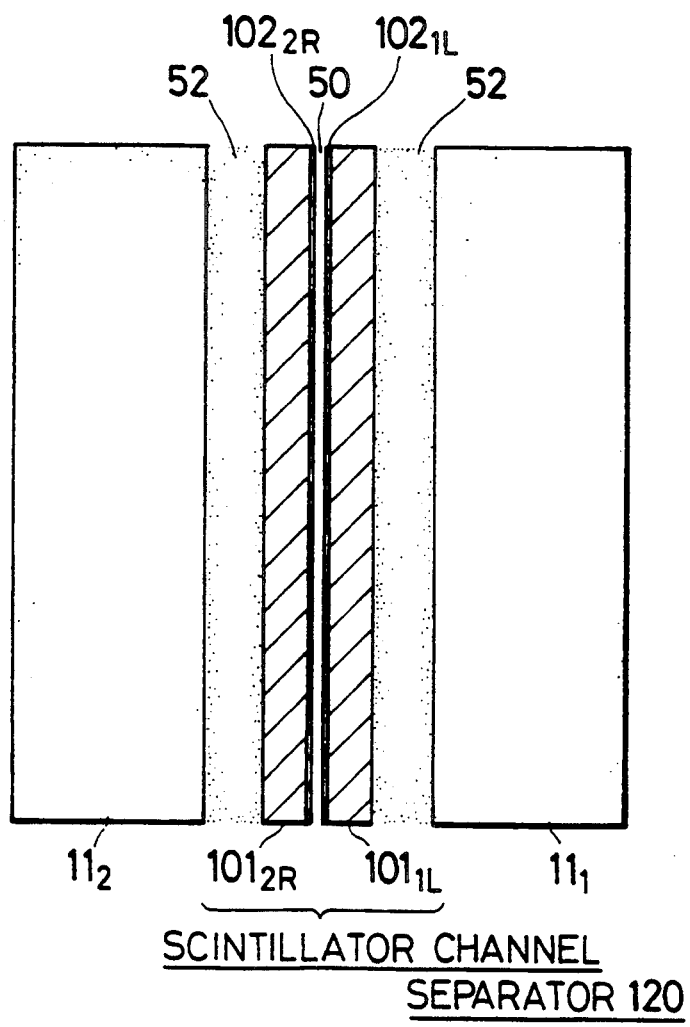
FIG. 3 is an enlarged illustration of the first scintillator channel separator 120 shown in FIGS. 2A and 2B.

In FIG. 3, there is illustrated a detailed construction of the above-described first scintillator channel separator 120.

As the above-explained color polymer sheet 1, a white polyester sheet 101 is employed. This white polyester sheet 101 is commercially available as "Lumirror" (tradename) from TORAY COOPERATION in Japan. Then an aluminum (Al) thin film 102 having a thickness of approximately 1,000 angstroms is vapor-deposited on the respective surfaces of the white polyester sheet 101.

As shown in FIG. 3, the right-hand aluminum thin film $102_{2R}$ of the second scintillator element $11_2$ is stuck to the left-hand aluminum thin film $102_{1L}$ of the first scintillator element $11_1$ by employing any sorts of adhesive agents, e.g., polyester adhesive agent 50.

On the other hand, each empty surface (namely, no Al-thin film surface) of these white polyester sheets $101_{1L}$ and $101_{2R}$ is stuck to the corresponding side surface of the scintillator elements $11_1$ and $11_2$ by using a proper adhesive agent such as a transparent epoxy resin adhesive agent 52.

The following typical manufacturing data are available in this first preferred embodiment.

A thickness of "Lumirror" sheet 101: approximately 50–100 micrometers (preferably 75 micrometers).

A thickness of aluminum thin film 102:
thicker than 0.1 micrometer (preferably 30 micrometers).

A thickness of adhesive agent 52:
approximately 2 micrometers for each side.

CONSTRUCTION OF X-RAY DETECTING APPARATUS

Figure 6:
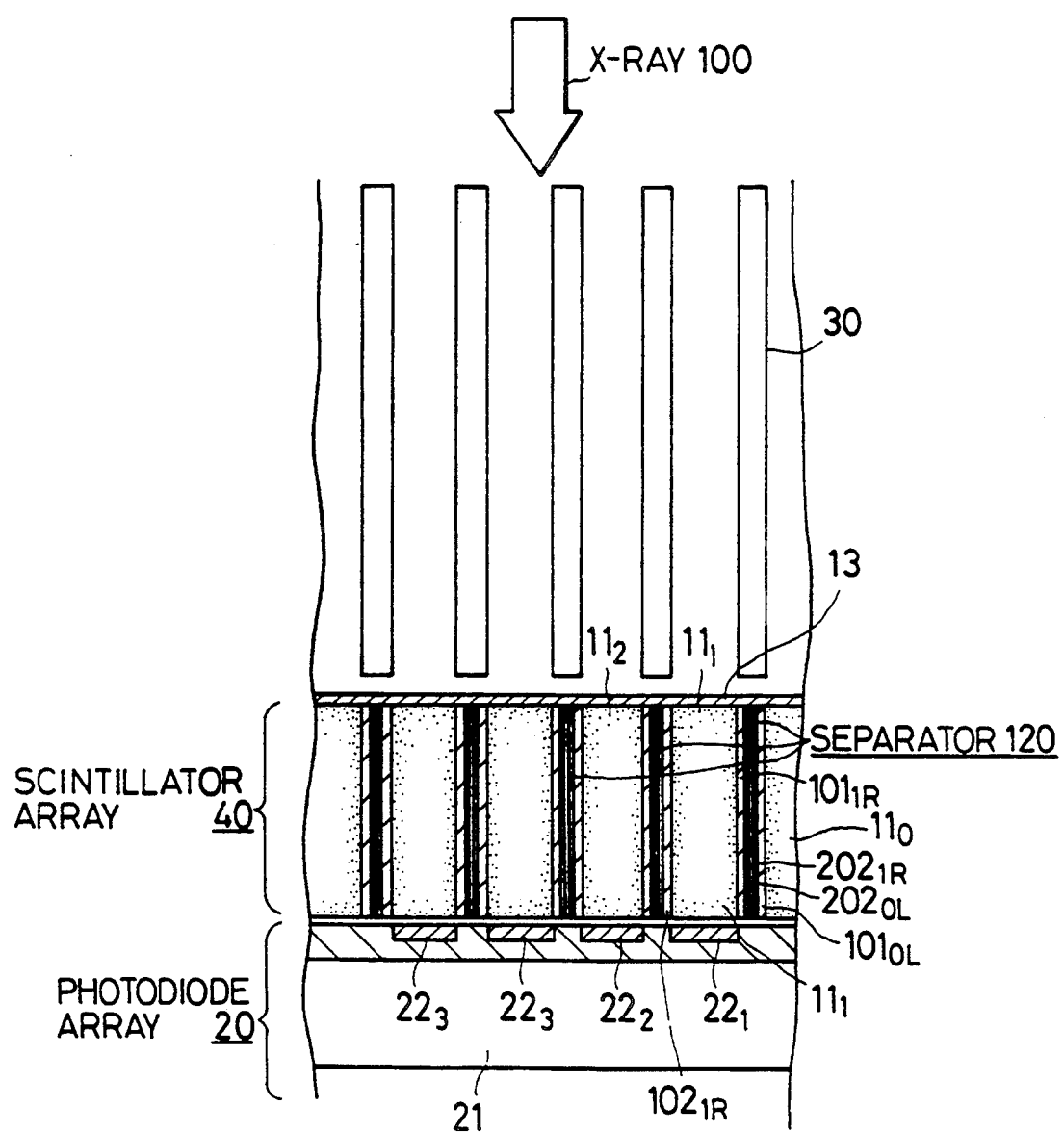
FIG. 6 schematically represents a major construction of an X-ray detecting apparatus employing the first scintillator channel separator 120 shown in FIG. 3.

FIG. 6 represents a major construction of an X-ray detecting apparatus employing the first scintillator channel separator 120 shown in FIG. 3.

As shown in FIG. 6, the X-ray 100 is incident upon a scintillator array 40 via the collimator 30 and the reflection layer 13. Then, scintillation light is emitted from the relevant scintillator element $11_1, \ldots, 11_n$ ("n" being an integer). A portion of the scintillation light is reflected on the scintillator channel separator 120, and finally is incident upon the relevant photodiode $22_1, \ldots, 22_n$ of the photodiode array 20. More specifically, according to the present invention, this scintillation light is substantially completely reflected from the polyester sheet 101 and the aluminum thin film 202 employed in this scintillator channel separator 120.

It should be noted that for the sake of simplicity, the adhesive agents 50 and 52 shown in FIG. 3 are omitted.

MODIFICATIONS

As apparent from the foregoing descriptions, the present invention is not limited to the above-described first scintillator channel separator 120, but may be changed, modified and substituted without departing from the technical scope and spirit of the present invention.

First, for instance, not only aluminum, but also gold (Au), silver (Ag), chromium (Cr), a stainless steel and other metal may be used as the metal thin film 2. In other words, if metals capable of shielding, or preventing light transmission are available, any sorts of such metals may be employed. Furthermore, although the aluminum thin film 101 is vapor-deposited on the "Lumirror" sheet 102 in the first preferred embodiment, such a thin film may be fabricated on the polymer sheet 2 by introducing many other thin film forming methods.

Also, there are two aluminum thin films $102_{1L}$ and $102_{1R}$ are stuck to each other in FIG. 3. Alternatively, only one aluminum thin film $102_{1L}$, or $102_{2R}$ is vapor-deposited on the relevant polyester sheet $101_{1L}$ or $101_{2R}$.

Also when the polyester sheet 101 is not readily stuck to the side surface of the scintillator element 11 in the actual manufacturing steps, the adhesive surface of this polyester sheet 101 may be processed by, for instance, the corona discharge surface process and the plasma discharge surface process.

Moreover, metal foil such as aluminum foil is sandwiched between white polyester sheets to form a laminated sheet. This laminated sheet may be used as the scintillator channel separator 120.

SENSITIVITY COMPARISON

For a better understanding of the advantages of the scintillator channel separator 120 according to the first preferred embodiment, the following data about the sensitivity comparison is available.

Figure 4A:
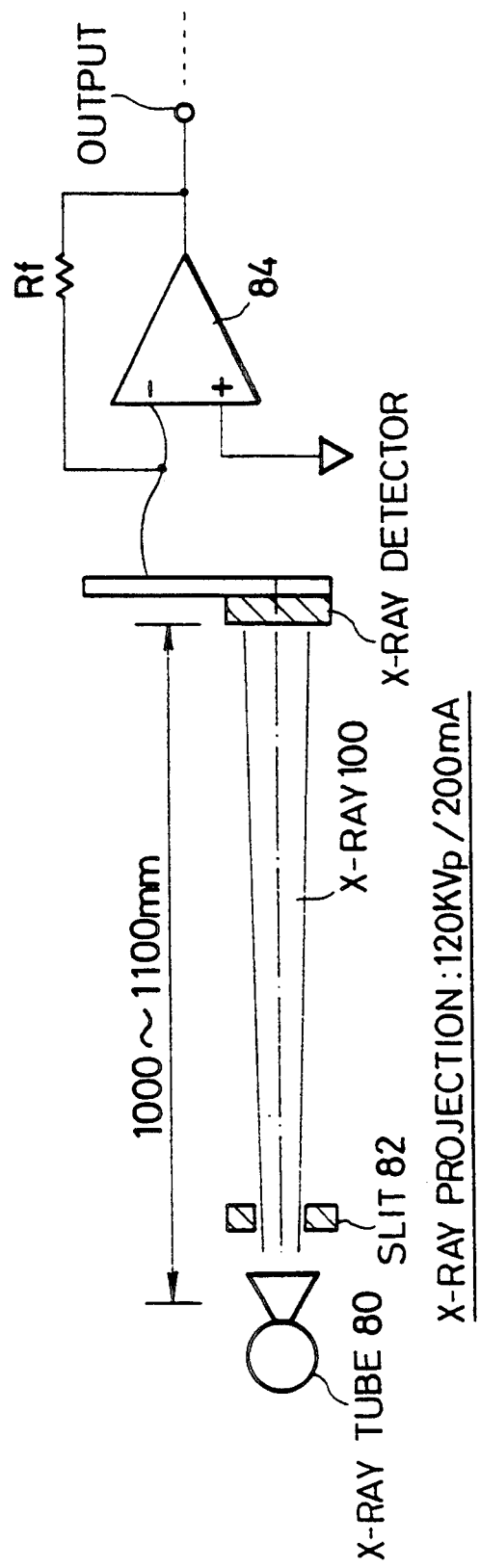
FIG. 4A schematically represents a measuring equipment for measuring the sensitivities of the conventional X-ray detector and the inventive X-ray detector.

FIG. 4A schematically represents a sensitivity measuring equipment for measuring sensitivity of the prior art X-ray detector (not shown in detail) and the inventive X-ray detector with the first separator 120 (see FIG. 3).

In FIG. 4A, a distance between an X-ray tube 80 and the scintillation type X-ray detectors (both of the conventional and inventive X-ray detectors) was selected to be approximately 1,000–1,100 mm. This X-ray tube 80 was operated under 120 KVp and 200 mA. The X-ray 100 is emitted from the X-ray tube 80 and projected via a slit 82 to the respective X-ray detectors. An output of the X-ray detector (i.e., photodiode array 20) is amplified in an operational amplifier 84 with a feedback resistor Rf. From an output terminal of the operational amplifier 84, an X-ray detection signal is derived in unit of (A/photon).

Under the above-described measuring conditions, various data about the conventional X-ray detector and also the inventive X-ray detector with the first scintillation channel separator 120 have been acquired as represented in FIG. 4B.

As a consequence, assuming now that the sensitivity of the conventional X-ray detector is set to 1, the resultant sensitivity of the inventive X-ray detector equipped with the first scintillation channel separator 120 became 1.1 to 1.2.

Furthermore, the Applicant has performed another measuring experiment, namely comparisons of reflectivity. The reflectivity measurement data were graphically represented in FIG. 5A and 5B. As obvious from FIGS. 5A and 5B, the typical reflectivity of the conventional X-ray detector was about 80%, whereas the typical reflectivity of the inventive X-ray detector equipped with the first scintillation channel separator 120 was approximately 90%.

While the present invention has been described with reference to the various preferred embodiments, there are many advantages that the high sensitivities of the scintillator type X-ray detectors can be achieved, since the scintillator channel separator is constructed of such a polymer sheet having high light diffusion reflectivity with the metal thin film.

Furthermore, since a total thickness of the scintillator channel separator can be made very thinner than that of the conventional channel separator, the effective widths of the scintillator elements can be widened as wide as possible, resulting in a high X-ray detecting performance. The scintillator channel separator of the present invention can be manufactured in a simple manufacturing method.

What is claimed is:

1. A scintillator channel separator for optically separating scintillation light from each other within each of plural scintillator element channels of an X-ray scintillator array, consisting essentially of
   a first thin film capable of blocking transmission of the scintillation light occurring in the adjoining scintillator element channels; and
   first and second polymer sheets each having first and second major surfaces, and capable of reflecting the scintillation light, said first thin film being sandwiched between said first major surfaces of said first and second polymer sheets, and said second major surfaces of said first and second polymer sheets being stuck to corresponding side surfaces of the respective adjoining scintillator elements, whereby said thin film and said first and second polymer sheets constitute the scintillator channel separator.

2. A scintillator channel separator as claimed in claim 1, wherein said first thin film is a metal thin film.

3. A scintillator channel separator as claimed in claim 2, wherein a metal of said metal thin film is selected from gold (Au), silver (Ag), chromium (Cr), stainless steel and aluminum (Al).

4. A scintillator channel separator as claimed in claim 2, wherein said metal film is formed on one of said first and second major surfaces of said first and second polymer sheets by vapor deposition.

5. A scintillator channel separator as claimed in claim 1, wherein said first and second polymer sheets are made of color polyester sheets.

6. A scintillator channel separator as claimed in claim 5, wherein color of said polyester sheets is white.

7. A scintillator channel separator as claimed in claim 1, wherein said first thin film is made of an aluminum thin film vapor-deposited on one of said first major surfaces of said first and second polymer sheets, and said second major surfaces of said first and second polymer sheets are stuck to said corresponding side surfaces of the respective adjoining scintillator elements by way of a transparent adhesive agent.

8. A scintillator channel separator for optically separating scintillation light from each other within each of plural scintillator element channels of an X-ray scintillator array, consisting essentially of:
   a first thin film capable of blocking transmission of the scintillation light occurring in the adjoining scintillator element channels;
   first and second polymer sheets having first and second major surfaces, and capable of reflecting the scintillation light, said first thin film being sandwiched between said first major surfaces of said first and second polymer sheets, and said second major surfaces of said first and second polymer sheets being struck to corresponding side surfaces of the respective adjoining scintillator elements, whereby said thin film and said first and second polymer sheets constitute the scintillator channel separator; and
   a second thin film capable of blocking transmission of the scintillation light occurring in the adjoining scintillator element channels, whereby both of said first thin film and said second thin film are sandwiched between said first major surfaces of said first and second polymer sheets.

9. A scintillator channel separator as claimed in claim 8, wherein both of said first thin film and said second thin film are metal thin films.

10. A scintillator channel separator as claimed in claim 9, wherein metals of said first and second metal thin films are selected from gold (Au), silver (Ag), chromium (Cr), stainless steel and aluminum (Al).

11. A scintillator channel separator as claimed in claim 10, wherein said first and second metal films are formed on one of said first and second major surfaces of said first and second polymer sheets by vapor deposition.

12. A scintillator channel separator as claimed in claim 8, wherein said first and second polymer sheets are made of color polyester sheets.

13. A scintillator channel separator as claimed in claim 12, wherein color of said polyester sheets is white.

14. A scintillator channel separator as claimed in claim 8, wherein said first and second thin films are made of aluminum thin films vapor-deposited on each of said first major surfaces of said first and second polymer sheets, and said second major surfaces of said first and second polymer sheets are stuck to said corresponding side surfaces of the respective adjoining scintillator elements by way of a transparent adhesive agent, and said first and second aluminum thin films are stuck to each other by way of an adhesive agent.

15. An X-ray detecting apparatus comprising at least:
   a scintillator array constructed of a plurality of scintillator elements for emitting scintillation light upon receipt of an X-ray;
   a photodiode array constructed of a plurality of photodiodes capable of detecting scintillation light emitted from said scintillator elements; and
   a scintillator channel separator for optically separating scintillation light from each other within each of plural scintillator element channels of said X-ray scintillator array, said scintillator channel separator consisting essentially of:
   a first thin film capable of blocking transmission of the scintillation light occurring in the adjoining scintillator element channels; and
   first and second polymer sheets each having first and second major surfaces, and capable of reflecting the scintillation light, said first thin film being sandwiched between said first major surfaces of said first and second polymer sheets, and said second major surfaces of said first and second polymer sheets being stuck to corresponding side surfaces of the respective adjoining scintillator elements, whereby said thin film and said first and second polymer sheets constitute the scintillator channel separator.

16. An X-ray detecting apparatus as claimed in claim 15, wherein said first thin film is a metal thin film.

17. An X-ray detecting apparatus as claimed in claim 16, wherein a metal of said metal thin film is selected from gold (Au), silver (Ag), chromium (Cr), a stainless steel and aluminum (Al).

18. An X-ray detecting apparatus as claimed in claim 16, wherein said metal film is formed on one of said first and second major surfaces of said first and second polymer sheets by vapor deposition.

19. An X-ray detecting apparatus as claimed in claim 15, wherein said first and second polymer sheets are made of color polyester sheets.

20. An X-ray detecting apparatus as claimed in claim 19, wherein color of said polyester sheets is white.

21. An X-ray detecting apparatus as claimed in claim 15, wherein said first thin film is made of an aluminum thin film vapor-deposited on one of said first major surfaces of said first and second polymer sheets, and said second major surfaces of said first and second polymer sheets are stuck to said corresponding side surfaces of the respective adjoining scintillator elements by way of a transparent adhesive agent.

22. An X-ray detecting apparatus comprising at least:
   a scintillator array constructed of a plurality of scintillator elements for emitting scintillation light upon receipt of an X-ray;
   a photodiode array constructed of a plurality of photodiodes capable of detecting scintillation light emitted from said scintillator elements; and
   a scintillator channel separator for optically separating scintillation light from each other within each of plural scintillator element channels of said X-ray scintillator array, said scintillator channel separator consisting essentially of:
   a first thin film capable of blocking transmission of the scintillation light occurring in the adjoining scintillator element channels;
   first and second polymer sheets each having first and second major surfaces, and capable of reflecting the scintillation light, said first thin film being sandwiched between said first major surfaces of said first and second polymer sheets, and said second major surfaces of said first and second polymer sheets being stuck to corresponding side surfaces of the respective adjoining scintillator elements, whereby said thin film and said first and second polymer sheets constitute the scintillator channel separator; and
   a second thin film capable of blocking transmission of the scintillation light occurring in the adjoining scintillator element channels, whereby both of said first thin film and said second thin film are sandwiched between said first major surfaces of said first and second polymer sheets.

23. An X-ray detecting apparatus as claimed in claim 22, wherein both of said first thin film and said second thin film are metal thin films.

24. An X-ray detecting apparatus as claimed in claim 23, wherein metals of said first and second metal thin films are selected from gold (Au), silver (Ag), chromium (Cr), stainless steel and aluminum (Al).

25. An X-ray detecting apparatus as claimed in claim 24, wherein said first and second metal films are formed on one of said first and second major surfaces of said first and second polymer sheets by vapor deposition.

26. An X-ray detecting apparatus as claimed in claim 22, wherein said first and second polymer sheets are made of color polyester sheets.

27. An X-ray detecting apparatus as claimed in claim 26, wherein color of said polyester sheets is white.

28. An X-ray detecting apparatus as claimed in claim 22, wherein said first and second thin films are made of aluminum thin films vapor-deposited on each of said first major surfaces of said first and second polymer sheets, and said second major surfaces of said first and second polymer sheets are stuck to said corresponding side surfaces of the respective adjoining scintillator elements by way of a transparent adhesive agent, and said first and second aluminum thin films are stuck to each other by way of an adhesive agent.

29. A scintillator channel separator for optically separating scintillation light from each other within each of plural scintillator element channels of an X-ray scintillator array, consisting of a first thin film capable of blocking transmission of the scintillation light occurring in the adjoining scintillator element channels; and first and second polymer sheets having first and second major surfaces, and capable of reflecting the scintillation light, said first thin film being sandwiched between said first major surfaces of said first and second polymer sheets, and said second major surfaces of said first and second polymer sheets being stuck to corresponding side surfaces of the respective adjoining scintillator elements, whereby said thin film and said first and second polymer sheets constitute the scintillator channel separator.

30. A scintillator channel separator for optically separating scintillation light from each other within each of plural scintillator element channels of an X-ray scintillator array, consisting of a first thin film capable of blocking transmission of the scintillation light occurring in the adjoining scintillator element channels;

first and second polymer sheets having first and second major surfaces, and capable of reflecting the scintillation light, said first thin film being sandwiched between said first major surfaces of said first and second polymer sheets, and said second major surfaces of said first and second polymer sheets being stuck to corresponding side surfaces of the respective adjoining scintillator elements, whereby said thin film and said first and second polymer sheets constitute the scintillator channel separator; and a second thin film capable of blocking transmission of the scintillation light occurring in the adjoining scintillator element channels, whereby both of said first thin film and said second thin film are sandwiched between said first major surfaces of said first and second polymer sheets.

* * * * *